UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

PROCESS OF TREATING POTASSIUM CONTAINING SILICATES AND PHOSPHATE-ROCK AND THE PRODUCT OF SUCH PROCESS.

1,217,389.

Specification of Letters Patent. Patented Feb. 27, 1917.

No Drawing. Application filed July 15, 1915. Serial No. 40,030.

*To all whom it may concern:*

Be it known that I, HARRY P. BASSETT, a citizen of the United States, residing at Catonsville, in the county of Baltimore and State of Maryland, have invented certain new and useful Improvements in Processes of Treating Potassium Containing Silicates and Phosphate-Rock and the Products of Such Processes, of which the following is a specification.

This invention relates to the treatment of insoluble potassium containing material, notably naturally occurring silicates such as feldspathic rock, green sand marl, and the like, to produce water soluble potassium salts therefrom, and has particular reference to a combined process of rendering normally insoluble potassium compounds soluble in water and rendering phosphate rock available for use as a fertilizer.

I have discovered that if phosphate rock is decomposed by the addition of a mineral acid adapted to decompose phosphate rock and particularly a dilute mineral acid adapted to decompose phosphate rock, such for example, as sulfuric acid, whereby the phosphoric acid component of the rock is made available for plant assimilation, and insoluble naturally occurring potassium containing silicates heated to a relatively low reacting temperature, as hereinafter set forth, with the decomposition products of the phosphate rock and acid in the presence of a reducing agent, the potassium salts in such silicates will be rendered soluble in water. While I prefer to employ carbon or a material consisting largely of carbon as my reducing agent, I may employ any reducing agent adapted to decompose oxygen containing acids. I have also found in practice, that some measure of success may be obtained by substituting a substantially equal amount by weight of sulfur or a correspondingly greater quantity of a sulfur compound readily decomposable by heat such as iron pyrites, for the carbon in the reaction.

In the practice of my process, the insoluble silicate and the phosphate rock are preferably first brought to a degree of fineness such that they will pass through a forty or sixty mesh sieve. A mixture of the silicate, phosphate rock, and a dilute mineral acid, to which may be added a small amount of the reducing agent, such as carbon, is heated to a reacting temperature, preferably to from 900° to 1000° F. The heating operation may be advantageously conducted in a rotary tube furnace, and I have found that the most satisfactory results are obtained by continuing the heating operation for from 45 minutes to 1 hour.

It is to be understood that the proportions of the ingredients will depend in a large measure upon the potassium content of the insoluble potassium containing materials under treatment. In the treatment of green sand marl or feldspar containing seven per cent. of potash figured as $K_2O$, I preferably mix the materials in the following proportions by weight:

Potassium containing silicate 10 parts.
Phosphate rock ------------ 1 to 2 parts.
Sulfuric acid ------------- 6 to 8 parts.
Water --------------------- 6 to 8 parts.
Carbon -------------------- .5 part.

From my experiments, it appears that the decomposition of the silicates begins at a dull red heat, and I have found it advantageous to employ a temperature of from 900° to 1000° F. although a somewhat higher temperature may be employed if desired. It is however, disadvantageous to heat the charge to a temperature materially above 1200° F.

The product of the reaction may be advantageously employed without further treatment, as a fertilizer. I may however leach such product with water, separate the soluble salts therefrom and subject the residue to a washing or floating operation to separate the iron oxid and calcium sulfate from the undesired products present. The iron oxid and calcium sulfate, in the condition in which they exist in the product of the reaction are relatively light as compared with the undesired products with which they are associated and may be readily separated therefrom by a washing or floating operation. The separated iron oxid and calcium sulfate when dry, are suitable for use as a pigment (Venetian red).

In the practice of my process a sulfuric acid salt of iron is produced and this at a temperature of 900° F. or above is decomposed producing iron oxid, sulfur dioxid and sulfur trioxid. The iron oxid by its catalytic action, transforms the sulfur dioxid into sulfur trioxid and the sulfuric trioxid is absorbed in water producing sulfuric acid. In this way a material part of the sulfuric acid employed as a reagent in the process is recovered for re-use in the process.

While I have described in detail the preferred embodiment of my process including the preferred reagents, proportions of ingredients, and details of procedure, it is to be understood that the proportions of ingredients and details of procedure may be widely varied and that known chemical equivalents of the reagents may be employed without departing from the spirit of my invention or the scope of the subjoined claims.

Having thus described my invention, I claim:

1. The herein described process of obtaining soluble potassium salts which consists in heating an insoluble potassium containing silicate and phosphate rock to a reacting temperature in the presence of a mineral acid adapted to decompose phosphate rock and a reducing agent.

2. The herein described process of obtaining soluble potassium salts, which consists in subjecting a mixture comprising insoluble potassium containing silicate, phosphate rock, water, and sulfuric acid to the action of heat at a reacting temperature, in the presence of a carbonaceous reducing agent.

3. The herein described process of obtaining soluble potassium salts which consists in heating an insoluble potassium containing silicate, phosphate rock, sulfuric acid, water and carbon to a temperature of approximately from 900° to 1200° F.

4. The herein described process which consists in heating to a reacting temperature an insoluble potassium containing silicate, phosphate rock, sulfuric acid, water and carbon in the following approximate proportions by weight: silicate 10 parts, phosphate rock 1 to 2 parts, sulfuric acid 6 to 8 parts, water 6 to 8 parts, carbon .5.

5. The herein described process of obtaining soluble potassium salts, which consists in subjecting a mixture comprising insoluble potassium containing silicate, a tricalcium phosphate, water, and sulfuric acid, to the action of heat at a reacting temperature, in the presence of a reducing agent.

In testimony whereof I affix my signature in presence of two witnesses.

HARRY P. BASSETT.

Witnesses:
PH H. HOFFMAN,
SAMUEL O. SOPER.